United States Patent [19]
Lee et al.

[11] Patent Number: 5,327,544
[45] Date of Patent: Jul. 5, 1994

[54] METHOD AND APPARATUS FOR DESIGNING GATEWAYS FOR COMPUTER NETWORKS

[75] Inventors: David Lee, Murray Hill; Arun N. Netravali, Westfield; Krishan K. Sabnani, Berkeley Heights, all of N.J.

[73] Assignee: AT&T Bell Laboratories, Murray Hill, N.J.

[21] Appl. No.: 752,127

[22] Filed: Aug. 29, 1991

[51] Int. Cl.$^5$ ............................................. G06F 13/00
[52] U.S. Cl. ............................. 395/500; 364/260.1; 364/261.1; 364/264.2; 364/242.94; 364/DIG. 1; 364/240.8
[58] Field of Search .................... 395/200, 500; 341/50

[56] References Cited

U.S. PATENT DOCUMENTS 4,648,061 3/1987 Foster ................................. 395/200

OTHER PUBLICATIONS

J. Auerbach, "A Protocol Conversion Software Toolkit," *Proc. of the ACM SIGCOMM 1989*, Austin, Tex., pp. 259–270, Sep. 1989.
G. V. Bochmann, *Principles of Protocol Conversion and Communication Gateways*, Publication #624, Universite de Montreal, Montreal, Canada.
K. L. Calvert and S. S. Lam, "Deriving a Protocol Converter: A Top-down Approach," *Proc. ACM SIGCOMM 1989*, Austin, Tex., pp. 247–258, Sep. 1989.
S. Lam, "Protocol Conversion," *IEEE Trans. Soft. Engr.*, vol. 14, No. 3, pp. 353–362, Mar. 1988.
P. M. Merlin and G. V. Bochmann, "On the construction of submodule specification and communication protocols," *ACM Trans. Prog. Lang. and Sys.*, vol. 5, No. 1, Jan. 1983.
K. Okumura, "A Formal Protocol Conversion Method," *Proc. ACM SIGCOMM 1986*, Stowe, Vt., pp. 30–37, Aug. 1986.
Y.-W. Yao, W.-S. Chen and M. T. Liu, "A Modular approach to constructing Protocol Converters," *Proc. INFOCOM 1990*, pp. 572–579, Jun. 1990.
Software Pipelining of Loops by Pipelining Strongly Connected Components, Jovanovic, Zoran, IEEE Comput. Soc. Press 1991 pp. 351–365.

*Primary Examiner*—Eric Coleman
*Attorney, Agent, or Firm*—Jason P. DeMont

[57] ABSTRACT

A method for synthesizing gateways from formal specifications. We present an efficient procedure that computes protocol converters from formal specifications. This procedure has a polynomial number of computation steps. The method involves computation of a common subset of services. This common subset is used to compute the converter. Conditions under which the converter can be stateless are also described.

2 Claims, 13 Drawing Sheets

```
begin
    initialize a data structure MATCH to keep track of all matched i/o's;
    initialize a list of active component machines: L = ∅;
    for (each FSM F_i) do
        if (F_i contains a service primitive edge not matched in S'_A and S'_B) then do
            delete all such edges; /* delete useless service primitives */
            append F_i to L; /* to be further pruned */
        end
    end
    while (L is not empty) do /* reduce component FSMs iteratively */
        remove an F_i from L;
        determine the strongly connected component C_i of F_i that contains the initial state;
        delete edges of F_i that are not in C_i;
        update MATCH with respect to edges deleted;
    end
    return pruned component FSMs F̃_i, i = 1, ···, k;
end
```

| A | B |
|---|---|
| ?data0 | !data00 |
| ?data1 | !data10 |
| !ack0 | ?ak1 |
| !ack1 | ?ak0 |

METHOD AND APPARATUS FOR DESIGNING GATEWAYS FOR COMPUTER NETWORKS

BACKGROUND OF THE INVENTION

This invention relates to computer networks in general, and more particularly to a method for synthesizing machines for converting between disparate computer protocols.

Figure 1:
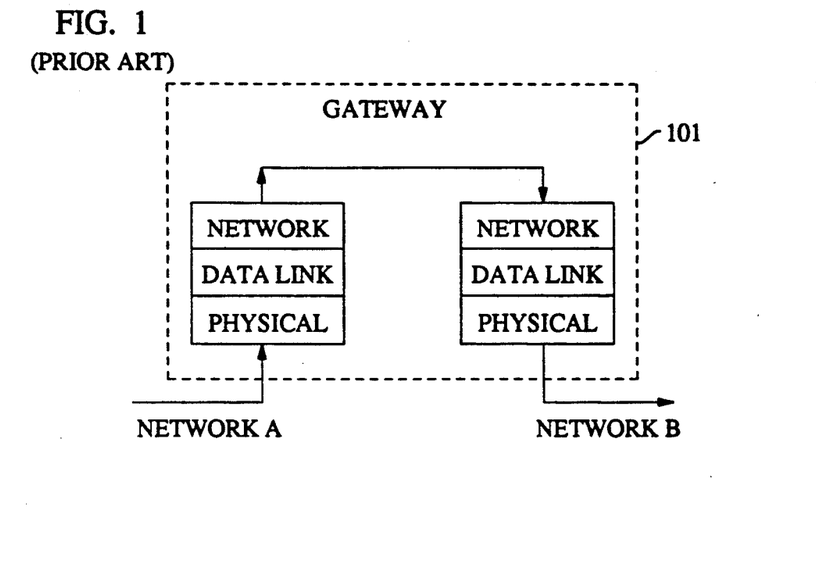
FIG. 1 presents the architecture of a typical gateway.

Computer networks are being constructed to provide electronic mail and file transfer services. Each network must have associated with it a well defined language or "protocol" to enable the respective computers on the network to be able to communicate. Different networks, however, often use different protocols (e.g., Systems Network Architecture (SNA), DECNET, and Open System Interconnection (OSI)) such that computers on one network may not be able to communicate with computers on another network without the assistance of a device or process (i.e., "machine") to translate between the two protocols. The machine that performs the translation between two disparate protocols is called a "gateway" and is shown at 101 in FIG. 1.

Gateways may be built manually using ad hoc techniques. However, it may be advantageous to generate gateways automatically from formal specifications of each protocol for one or more of the following reasons:
1. the gateway can be proved to be correct;
2. the gateway can be built quickly;
3. the gateway can be changed quickly to adapt to changes in the protocol standards.

SUMMARY OF THE INVENTION

The invention provides a method for synthesizing a gateway between one or more protocols. An illustrative embodiment of the invention recognizes that a protocol can be represented by a set of processes and that a protocol provides a set of services. The embodiment includes: computing a set of services common to at least two of the protocols, and computing a set of machines to represent the set of common services.

DETAILED DESCRIPTION

Figure 2:
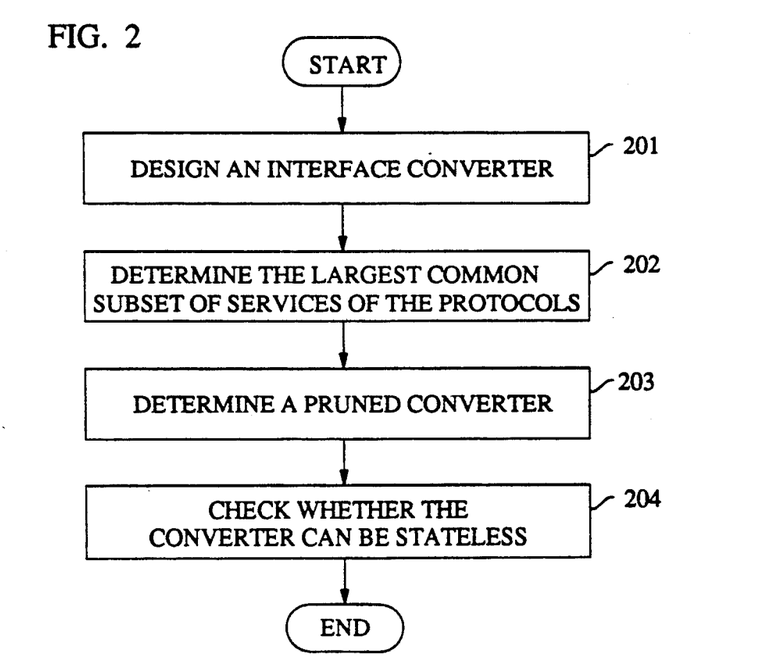
FIG. 2 shows the procedure associated with synthesizing a gateway according to an embodiment of the invention.
Figure 5:
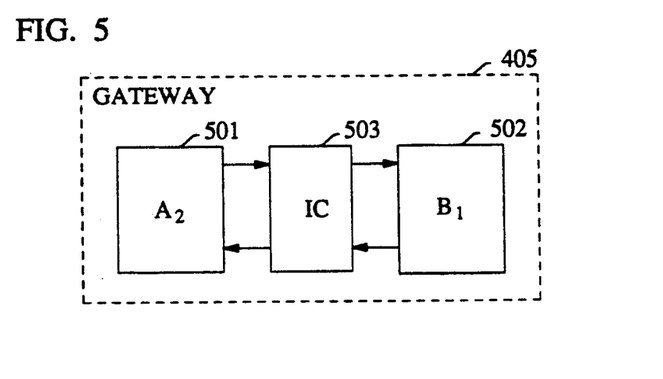
FIG. 5 presents a gateway for converting from protocol A to protocol B and vice versa.

An illustrative embodiment of the present invention is presented in FIG. 2 and can be constructed with the following steps:
1. Design an Interface Converter (IC) (step 201 in FIG. 2). The IC matches service primitives of protocol A with those of protocol B. There must be a reasonable degree of correspondence of functionality at this level; otherwise, conversion between protocol A and B does not make any sense.
2. Determine the largest common subset of services offered by protocols A and B (step 202 in FIG. 2). If $A_1$ is connected to $B_2$ through a converter, the converter can provide, at most, such a common subset.
3. Determine a pruned gateway (step 203 in FIG. 2). As shown in FIG. 5, a gateway consists of $A_2$, IC, and $B_1$. Some parts of $A_2$ and $B_1$ are never exercised in providing common services. Remove these parts from the converter to determine a pruned converter.
4. Check whether the conversion can be stateless (step 204 in FIG. 2).

Before proceeding with the detailed discussion, an overview on notation is in order.

I. NOTATION

A protocol may be modeled by a collection of communicating finite state machines (FSMs). The FSMs are capable of sending and receiving messages and a notation of input/output (i/o) operations may be used to specify the interaction between the FSMs.

A FSM sends a message to other FSMs by means of an "output operation" designated by the "!" symbol. Where, for example, there are two FSMs, machine #1 and machine #2, an output operation in machine #1 is denoted by machine2!msg (i.e., send the message "msg" to machine #2). FSM's also receive messages and for each message that is sent by one FSM there must be a receipt of the message by at least one other FSM.

A FSM receives a message from another FSM by means of an "input operation" designated by the "?" symbol. With respect to the output operation exemplified above, the corresponding input operation in machine #2 is denoted by machine1?msg (i.e., receive the message "msg" from machine #1). NOTE: the operations, machine1!msg and machine2?msg are executed simultaneously because they represent different perspectives of the same event. Neither operation can be executed individually. Thus, if a first FSM attempts to do an output operation, it has to wait until a second FSM is ready to execute the corresponding input operation and vice versa. The synchronized message exchange between two FSMs is called a rendezvous.

When, in an input (output) operation, the FSM name is not specified, then the operation can take place with any other FSM that is ready to execute the corresponding operation. For example, if a FSM has an operator ?msg, the FSM is triggered by the receipt of "msg" from any other FSM. Such operations are used to model protocols' interactions with multiple users on multiple communication channels.

Formally, an FSM is a four-tuple $F=(\Sigma, V, p, s_0)$ where $\Sigma$ is an alphabet consisting of all of the FSM's i/o operations and an internal operation called Int; V is a finite set of states that the FSM may be in; p: $V \times \Sigma \rightarrow 2^V$ is a nondeterministic state transition function (e.g., machine!msg or machine?msg); and $s_0$ is the initial state of F. An internal operation within the FSM is an unobservable action. While doing an internal transition from one state to another state, an FSM makes a state transition without interacting with any other FSM. For more information regarding FSMs see Z. Kohavi, *Switching Theory and Finite Automata Theory*, McGraw-Hill, 275-315 (1978) and C. A. R. Hoare, *Communicating Sequential Processes*, Communications of the ACM, Vol. 21, No. 8, 666-677 (August 1978).

A FSM may be represented as a directed graph (V,E) where V is the set of states in the FSM and E is the set of edges or possible state transitions between states. Each state of an FSM is represented in a directed graph by a circle encircling the designation of the state. Each edge is labeled by an i/o operation (belonging to $\Sigma$) which either triggers the state transition or is a result of the state transition. Additionally, an edge may be labeled by two or more i/o operations which independently or in conjunction trigger the state transition or are the result of it.

For nontational purposes, an edge labeled by a*b denotes an edge labeled by an i/o operations a followed by an i/o operation b. The symbol "*" represents the boolean AND operator. Therefore, an edge labeled by ?ack0*?cancel is only triggered by the receipt of the messages "ack0" and "cancel". An edge labeled by ?ack0*!start is triggered by the receipt of the message ack0 and triggers the sending of the message start.

An edge labeled by a+b denotes an edge labeled by two i/o operations: a and b. The symbol "+" represents the boolean OR operator. For example, an edge labeled by ?ack1+?start is triggered by the receipt of either of the messages "ack1" or "start".

A FSM always starts in its initial state $s_0$. The initial state is labeled 0 and may be additionally designated in the directed graph representing the FSM by the presence of a concentric circle surrounding the 0. When the FSM is in any given state it can execute any of the operations labeling a transition from that state. A protocol provides one or more services to the user of the protocol. These are also represented as an FSM called the service FSM. Note: there is not necessarily a one-to-one mapping (or correlation) between the set of services provided by a protocol and the set of FSMs that can represent the protocol.

NOTE: if an edge in one FSM is labeled by an i/o operation that has no corresponding operation in another FSM, the transition can never occur. For example, if an edge in machine1 is labeled machine2!msg, and machine2 contains no edge labeled machine1?msg, the transition in machine1 can never occur. This discovery is utilized to design the two methods given here for generating protocol converters.

For any two FSMs $F_1$ and $F_2$, a FSM designated $F_1\#F_2$ can be built that corresponds to the joint behavior of $F_1$ and $F_2$. The FSM $F_1\#F_2$ is called the reachable FSM or the composition of $F_1$ and $F_2$. The process of constructing $F_1\#F_2$ from the components $F_1$ and $F_2$ is called the reachability computation or composing and is well known in the art. Finding the reachable FSM is done by computing the reachable global states. A global state for $F_1\#F_2$ is defined as a two-tuple $(s_1, s_2)$, where $s_1$ is the current state of $F_1$ and $s_2$ is the current state of $F_2$.

2. PROCEDURES THAT GENERATE CONVERTERS

Figure 3:
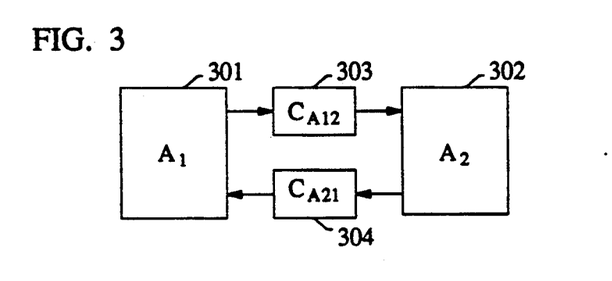
FIG. 3 presents the component finite state machines that comprise a computer protocol.

A protocol, A, may be modeled as consisting of 4 FSMs, $A_1$ 301, $A_2$ 302, $C_{A12}$ 303, $C_{A21}$ 304 as shown in FIG. 3. $A_1$ and $A_2$ are two end entities (i.e., associated with different computers) and $C_{A12}$ and $C_{A21}$ represent half-duplex (one-way) communication channels between $A_1$ and $A_2$. $C_{A12}$ ($C_{A21}$) transports messages from $A_1$ ($A_2$) to $A_2$ ($A_1$). Similarly, a protocol, B, consists of four similar FSMs: $B_1$, $B_2$, $C_{B12}$, $C_{B21}$ (not shown).

Figure 4:
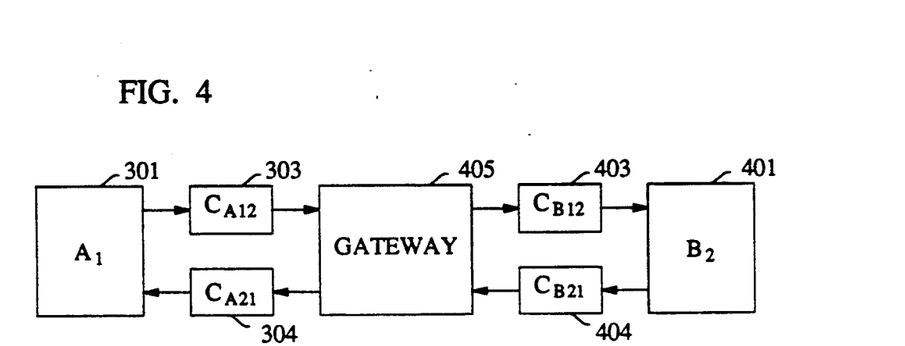
FIG. 4 presents the overall block diagram of a gateway.

When a first entity, associated with $A_1$ and using protocol A, desires to communicate with another entity, associated with $B_2$ and using protocol B, an additional component, a gateway is needed to translate between the protocols. As shown in FIG. 4 gateway 405 is a FSM that interacts with the relevant FSMs of protocols A and B. As shown in FIG. 5, gateway 405 consists of the FSMs $A_2$ at 501, B, at 502 and a FSM called the interface converter (IC) 503. The IC performs the semantic translation between the two protocols.

2.1 Design an Interface Converter.

The services provided by protocol A (B) are specified as an FSM $S_A$ ($S_B$). The i/o operations of $S_A$ and $S_B$ are the service primitives of A and B, respectively. Let the set of i/o operations of $A_1$ ($A_2$) with its local user or the upper layer be $IA_1$ ($IA_2$). Similarly, let the set of i/o operations of $B_1$ ($B_2$) with its local user or the upper layer be $IB_1$ ($IB_2$).

For example, suppose A and B are both data transfer protocols. Suppose also that a first user, who uses protocol A, wishes to send data to a second user who only uses protocol B. To do this the first user directs its end unit $A_1$, via a service primitive, to establish a connection with the second user via its end unit $B_2$. $A_1$ sends a message to $A_2$ so that $A_2$ will generate a service primitive to indicate to its local user that the first user, connected to $A_1$, wishes to establish a connection with it. On receiving this output service primitive, the interface converter IC generates an input service primitive for protocol B indicating that a local user (in this case, $A_2$) wants to establish a connection to a user on a network running protocol B.

In essence, $A_2$, $B_1$, the interface converter, $C_{A12}$, $C_{A21}$, $C_{B12}$, and $C_{B21}$ provide all of the necessary translations between protocols A and B. $B_1$ portrays $A_2$ for protocol A. Similarly, $A_2$ plays $B_1$ for protocol B. The output service primitives for $A_2$ are tied to the input service primitives for $B_1$. Similarly, the output service primitives from $B_1$ are tied to the input service primitives for $A_2$. The input service primitives for $A_2$ may not have a one-to-one correspondence with the output service primitives of $B_1$. In such a case, the designer has to develop a translation between the elements of $IA_2$ and those of $IB_1$. In most cases, this mapping or translation is one-to-one. In some other cases, the mapping may be more complex. For example, two output service primitives x and y from $A_2$ may be equivalent to only one input service primitive z for $B_1$. Consequently, between $A_2$ and $B_1$, a translator box must be inserted that is capable of generating z in response to receiving x and y. This translator box is modeled as a FSM and is called the interface converter (IC).

Note that there may be cases in which there are service primitives of A which do not have any analogous counterpart to any combination of service primitives of B. In such cases, no attempt is made to translate between the service primitives. These service primitives are the ones that result in the reduction given later. In the procedure given here, defining the IC is non-algorithmic and has to be done manually.

Each service primitive in $IA_1$ ($IB_1$) typically has a corresponding service primitive in $IA_2$ ($IB_2$). For example, a service primitive that requests connection establishment for $A_1$ has a corresponding service primitive that indicates a connection establishment request for $A_2$. Identify those service primitives of $A_1$ and $B_2$ that correspond to the service primitives of $A_2$ and $B_1$ that are not translated by IC. These service primitives should never be invoked while using the largest common subset of services. This point is used to reduce the converter design.

2.2 Determine the Largest Common Subset of Services Offered By A and B.

In the service FSMs of A and B ($S_A$ and $S_B$), remove the edges that correspond to service primitives not matched in Step 1. Let the resulting pruned FSMs be denoted as $S_A'$ and $S_B'$. Then determine:

$$W = S_A' \# IC \# S_B'$$

where W is a common subset of service primitives offered by A and B. It is preferred that W is the largest common subset of service primitives offered by A and B. This FSM is subsequently reduced while maintaining its observational equivalence. See R. Milner, A Calculus of Communicating Systems, Springer-Verlag 1980. The services that both protocols provide are kept in this FSM W; other services are discarded.

2.3 Determine a Pruned Converter.

Two alternative methods are presented for computing a pruned converter.

Figure 6:
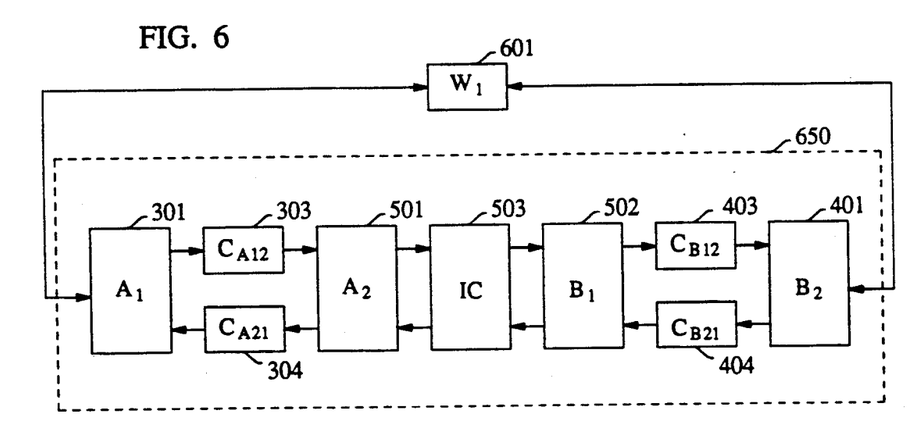
FIG. 6 presents the finite state machines to be composed in Method 1.

Method 1: Keep in the converter only those parts of $A_2$ and $B_1$ that are necessary to provide W, the largest common set of services. To determine such parts of $A_2$ and $B_1$, compose all the FSMs in A and B, IC, and a machine, 601 in FIG. 6, that provides the largest common subset of services (FIG. 6). These machines are $A_1$ 301, $C_{A12}$ 303, $C_{A21}$ 304, $A_2$ 502, IC 503, $B_1$ 502, $C_{B12}$ 403, $C_{B21}$ 404 and $B_2$ 401. The machine exercising the converter box basically consists of an image of W, $W_I$, in which an input operation (?x) is replaced by its output operation (!x). Determine:

$$W_I \# A_1 \# C_{A12} \# C_{A21} \# A_2 \# IC \# B_1 \# C_{B12} \# C_{B21} \# B_2$$

During this composition, mark those edges in component FSMs that are executed at least once during this composition.

Construct a pruned FSM $A_2^*$ with only the marked edges in $A_2$ and with all states of $A_2$. Similarly, construct a similar pruned FSM $B_1^*$ with the marked edges in $B_1$. Then, the converter is $A_2^* \# IC \# B_1^*$.

Let $A_1$, $A_2$, $B_1$, $B_2$, $C_{A12}$, $C_{A21}$, $C_{B12}$, $C_{B21}$, IC, and $W_1$ be a set of interacting FSMs: $F_1, F_2, \ldots, F_n$. Suppose the FSM $F_i$ has $m_i$ transitions. Then the above method takes time $$O\left(\sum_{i=1}^{n} m_i\right).$$

Method 2: This method removes from $A_2$ and $B_1$ those edges that have unmatched service primitives as labels. Then, for each machine, the method determines and retains the strongly connected component of the FSM that starts at the initial state and discards the rest of the machine. As a result of pruning one FSM edges of other FSMs may no longer have corresponding edges (i/o's) such that those unmatched edges must also be removed. For the FSMs which have had edges removed, again determine the strongly connected components starting from their initial states and discard the rest of the machines. (Note: FSMs for protocols that do not have infinite loops for data transfer are made strongly connected by adding some dummy transitions. Examples of such protocols are connection management and call setup protocols.) This process is continued iteratively until each pruned FSM: 1) contains a strongly connected component that contains the initial state, and 2) contains every i/o transition that has a corresponding i/o transitions in another FSM.

Figure 7:
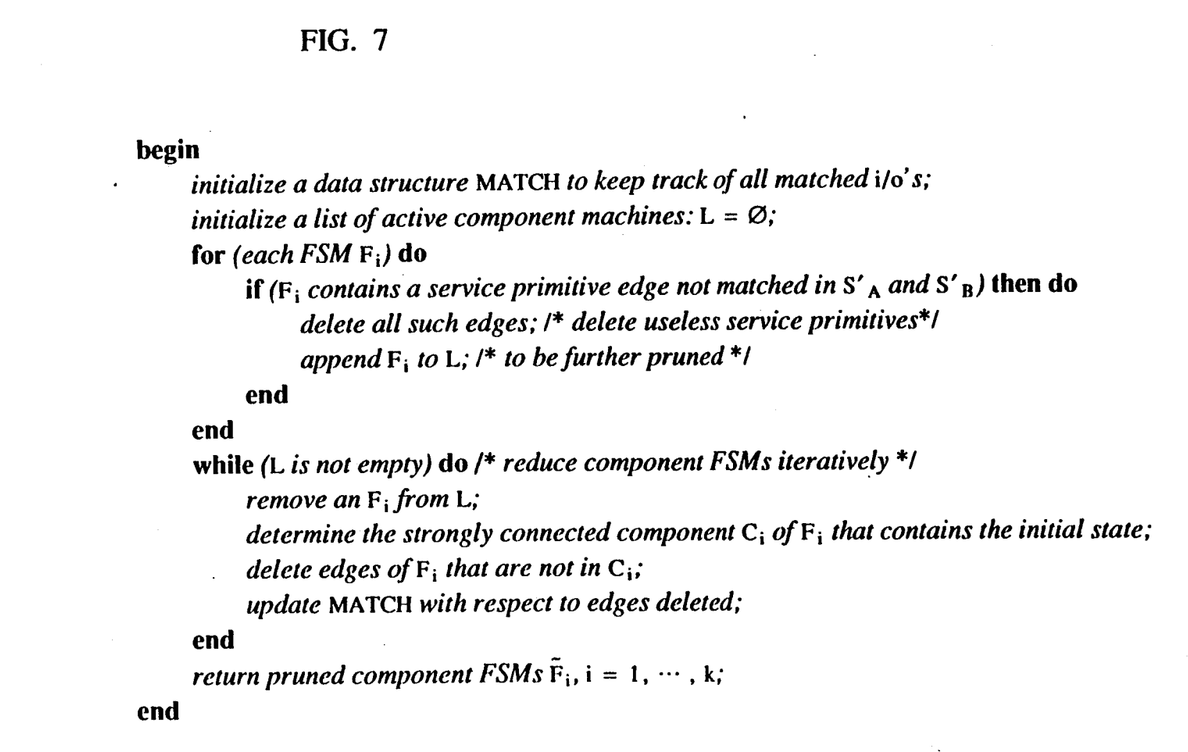
FIG. 7 presents the procedure, associated with one embodiment, that is involved in computing a pruned converter.

Intuitively, the idea behind the method is to remove those parts of the FSMs that can be reached only by applying unmatched service primitives and that the remaining FSMs have to be strongly connected. Let $A_2$ and $B_1$ consist of interacting FSMs: $F_1, F_2, \ldots, F_k$. FIG. 7 shows Method 2 in detail. The use of the MATCH data structure is described in more detail later.

The set of pruned machines: $\overline{F}_i$, i=1, ..., k, contains the resulting converter $(\overline{A}_2 \# IC \# \overline{B}_1)$. $\overline{A}_2$ ($\overline{B}_1$) is the pruned version of $A_2$ ($B_1$) generated by this method. This converter will be shown to contain the converter generated by Method 1.

The data structure MATCH keeps track of the corresponding i/o's. Identical i/o's are associated with a counter, which records their total number. Counters of corresponding i/o's are associated with each other. When an i/o is deleted, its associated counter is decreased by one. When a counter becomes zero, check all its associated counters as follows. If a counter $\mu$ has no corresponding counters (all of them have become zero), then change $\mu$ to zero and delete all its associated i/o's. The associated counters of $\mu$ are processed similarly. This counter updating is done iteratively until none of the involved counters have to be changed. On the other hand, whenever an i/o is deleted from a machine, append the FSM to L if it is not there. Obviously, the total cost to initialize and to update MATCH is $$O\left(\sum_{i=1}^{k} m_i\right),$$

where $m_i$ is the number of edges of $F_i$.

Use a k-bit vector to record whether $F_i$ is in L. If $F_i$ is in L, then the ith bit is 1, otherwise, 0. To update the vector and to check whether $F_i$ is in L takes constant time.

Whenever a component FSM $F_i$ is appended to L, at least one edge has been removed. Whenever a component FSM $F_i$ is removed from L, construct the strongly connected component that contains the initial state. It takes time $O(m_i)$ to determine the strongly connected component of $F_i$, using depth-first search. Since a FSM $F_i$ can be removed from L only after it has been appended to L, if the cost of processing is charged to each machine, then the total cost is $$O\left(\sum_{i=1}^{k} d_i m_i\right),$$

where $d_i$ is the number of edges deleted from $F_i$.

Method 1 constructs a set of minimal pruned component FSMs $F_i^*$, i=1, ..., k. It can be shown that $F_i$, which Method 2 constructs, contains $F_i^*$.

First delete all the service primitives that are not matched in $S'_A$ and $S'_B$. Obviously, they are not in $F_i^*$ either. Therefore, after the first loop in Method 2, our claim is true. Since $F_i^*$ is strongly connected and contains the initial state, $C_i$ must contain $F_i^*$, and, after deleting all the edges not in $C_i$, our claim still holds. If an edge becomes unmatched after MATCH is updated., this edge (i/o) can never be exercised, and therefore, cannot be in $F_i^*$. After deleting this edge, our claim still holds. Therefore, during the whole process, the minimal component FSMs $F_i^*$ are always contained in the (pruned) FSM $F_i$. In summary:

Theorem 1. Given a set of interacting component finite state machines $F_i$, i=1, ..., k, Method 2 constructs a set of pruned component machines $F_i$, i=1, ..., k, that is strongly connected and contains the corresponding minimal machines $F_i^*$. The total cost is $$O\left(\sum_{i=1}^{k} d_i m_i\right),$$

where $m_i$ is the number of edges of $F_i$ and $d_i$ is the number of edges removed from $F_i$.

Discussion: Method 1 generates at least as good a converter as Method 2. But Method 1 requires composition of processes and can encounter the well-known state explosion problem. In fact it can be shown that this problem is PSPACE-complete, and the cost of constructing the minimal converter is inherently exponential. Method 2 avoids this problem.

In Method 2, if each component machine $F_i$ is looked at separately, then this is on-line maintenance of the strongly connected components of dynamic graphs. Method 2 is not really on-line. For undirected graphs, one can do better. However, for directed graphs, it is a challenging problem. On the other hand, our problem is not really "on-line". The edges to be deleted at the very beginning are known, and further deletions are due to the mutual constraints of the machines involved and are done iteratively.

2.4 Check whether the converter can be stateless.

In some cases the converter can be stateless (i.e., conversion can be done by a table lookup). Such a converter essentially does one-to-one message translation. A stateless converter cannot perform a non-trivial function such as retransmissions. It acts as a relay, and the protocol functions, such as retransmissions, are done in the end entities such as $A_1$ and $B_2$. Suppose both protocols are data transfer protocols. If an acknowledgement is lost in the channel from $B_2$ to $B_1$, then the retransmission will be done by $A_1$.

Let $A'_i$ and $B'_i$, i=1, 2, be the pruned FSMs from $A_i$ and $B_i$, respectively, with the unmatched transitions removed. Then a stateless converter can be built if the following condition is satisfied.

$A'_1 \# C_{A12} \# C_{A21} \# cv \# C_{B12} \# C_{B21} \# B'_2$ provides the common services specified by W, where cv performs one-to-one message transformation.

In this case, the converter cv performs a one-to-one message transformation. This converter, along with the protocol FSMs $A_1$ and $B_2$, provides the common services. The condition given above can be checked by standard verification techniques.

3. AN EXAMPLE

Figure 8:
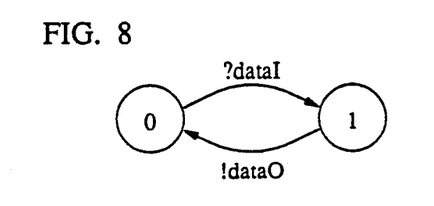
FIG. 8 presents the service finite state machine for HABP, $S_H$.

Consider two protocols, a half-duplex alternating bit protocol (HABP) and a full-duplex alternating bit protocol (FABP). HABP transports data messages from a first user to a second user process over a lossy communication channel but not in the reverse direction. FABP allows two remote users to exchange data messages in both directions. The service FSM for HABP, $S_H$ is shown in FIG. 8. Its alphabet is {?dataI, !dataO}. In the input operation ?dataI, HABP picks up a message from a user. During the output operation !dataO, HABP delivers a data message to the user.

Figure 9:
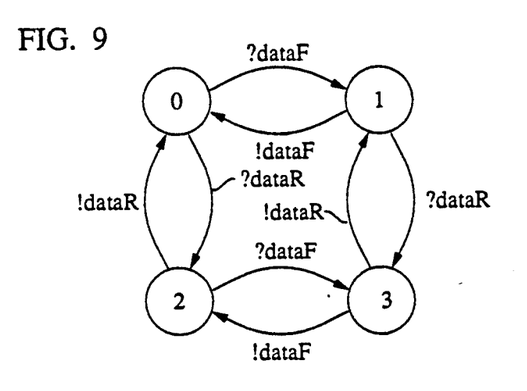
FIG. 9 presents the service finite state machine for FABP, $S_F$.
Figure 10:
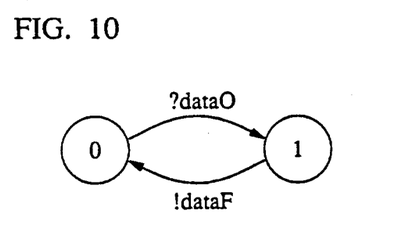
FIG. 10 presents the Interface Converter between the service finite state machine for HABP and the service finite state machine for FABP.

The service FSM for FABP, $S_F$, is shown in FIG. 9. This protocol picks up a message from one user using the input operation ?data F and delivers it to another using the output operation !dataF. In the reverse direction, the corresponding i/o operations are ?dataR and !dataR. Only one service primitive !dataO of $S_H$ corresponds semantically to ?dataF of $S_F$ and this is used to construct the IC shown in FIG. 10. The service primitives ?dataR and !dataR are never exercised in $S_F$ during this conversion.

Figure 11:
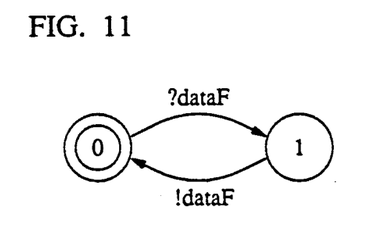
FIG. 11 presents the Reduced service finite state machine, $S'_F$.
Figure 12:
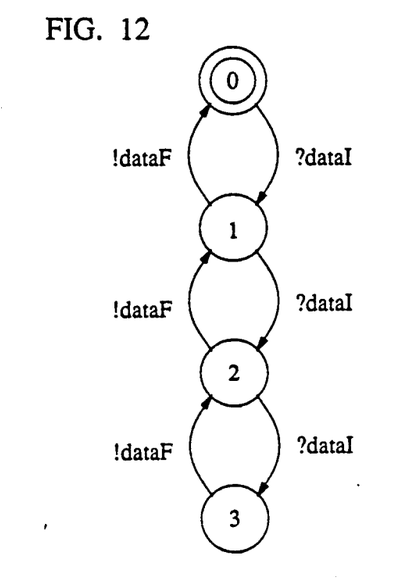
FIG. 12 presents the Reduced $W' = S_H \# IC \# S'_F$.

The pruned service FSM ($S'_F$) is shown in FIG. 11. Since both service primitives of HABP are exercised in providing the common service, the service machine $S_H$ cannot be pruned. The weaker set of services W' is given as ($S_H$#IC#$S'_F$). This machine is reduced while maintaining its observational equivalence. The reduced machine is given in FIG. 12.

Figure 13:
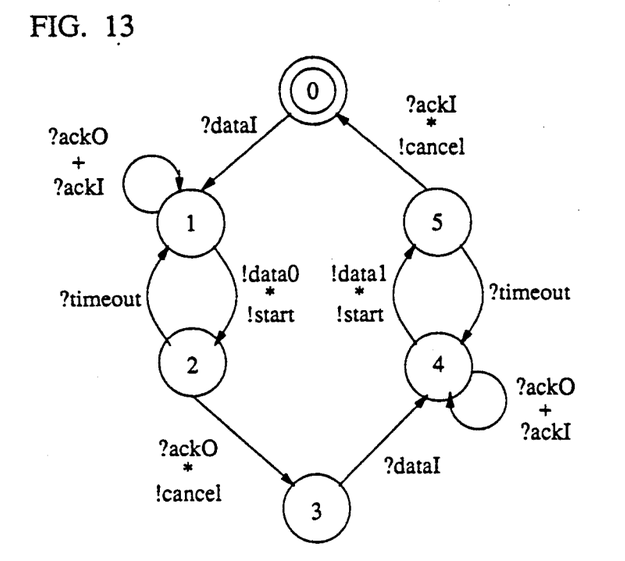
FIG. 13 presents the finite state machine for the HABP Transmitter, Htrans.
Figure 14:
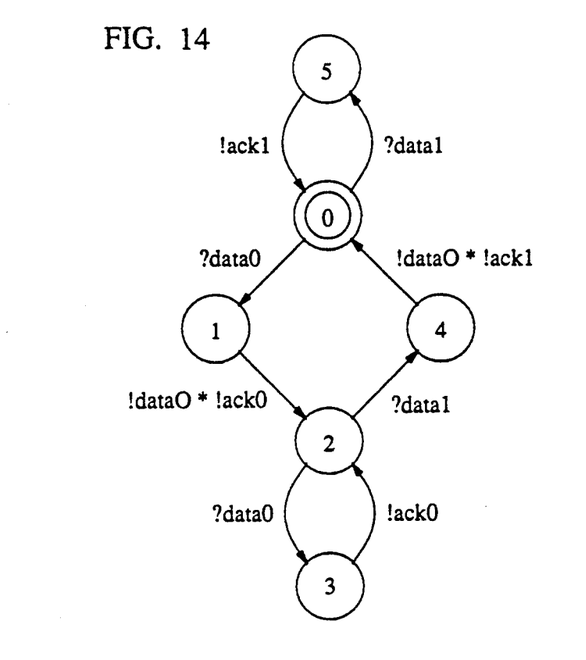
FIG. 14 presents the finite state machine for the HABP Receiver, Hrec.
Figure 15:
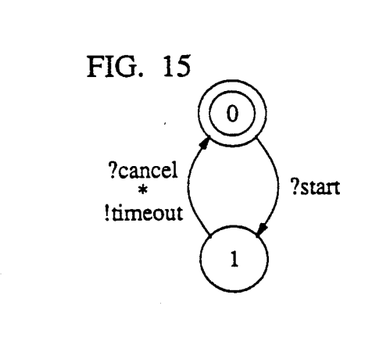
FIG. 15 presents the finite state machine for the HABP Timer.
Figure 16:
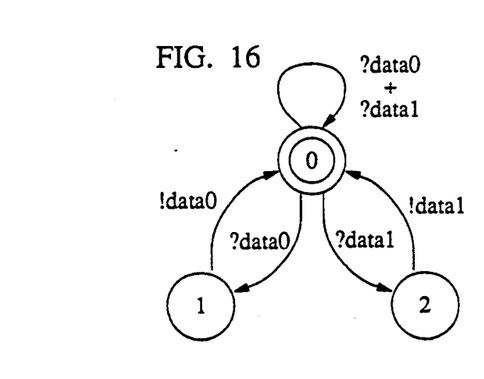
FIG. 16 presents the finite state machine for the HABP Communications Channel $C_{A12}$.
Figure 17:
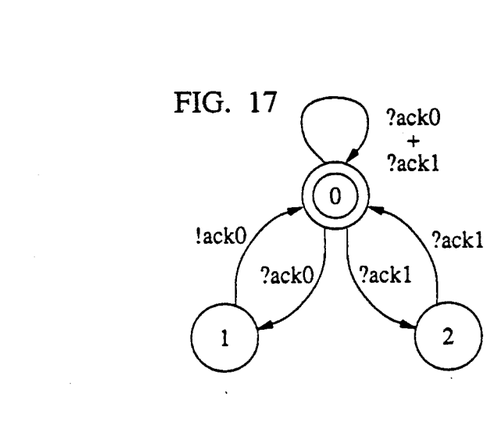
FIG. 17 presents the finite state machine for the HABP Communications Channel $C_{A21}$.

Next, the procedure for how to generate a minimal converter for these two protocols will be described. HABP consists of five machines: Htrans (FIG. 13); Hrec (FIG. 14); timer (FIG. 15); $C_{A12}$ (FIG. 16); and $C_{A21}$ (FIG. 17). FSM Htrans implements a simple retransmission procedure. It has a satellite FSM, timer; $C_{A12}$ and $C_{A21}$ are forward and reverse communication channels. $C_{A12}$ transports data messages from Htrans to Hrec. $C_{A21}$ transports acknowledgements in the reverse direction. An acknowledgement is an indication from Hrec to Htrans that it received a message correctly.

FSM Htrans picks up a message (using the input operation ?dataI) from its user process and sends it with a sequence number, either 0 or 1, to Hrec over the data medium $C_{A12}$. It also starts a local timer timer and waits for an acknowledgement. When Hrec receives a message with the next expected sequence number, it gives it to its local user (using the output operation !dataO) and sends an acknowledgement to Htrans over the acknowledgement medium $C_{A21}$. Each acknowledgement also carries a sequence number that is either 0 or 1.

Figure 18:
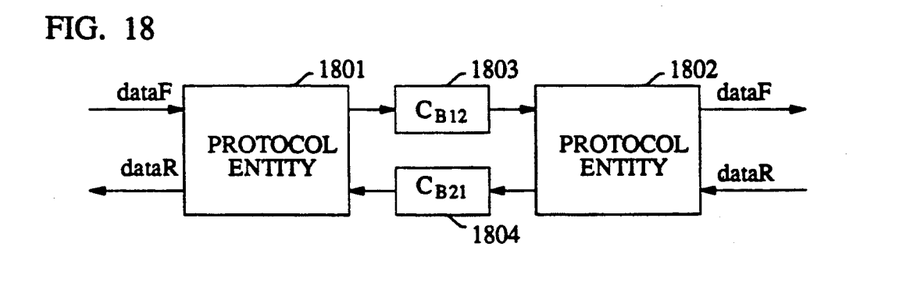
FIG. 18 presents the block diagram of the FABP Organization.
Figure 19:
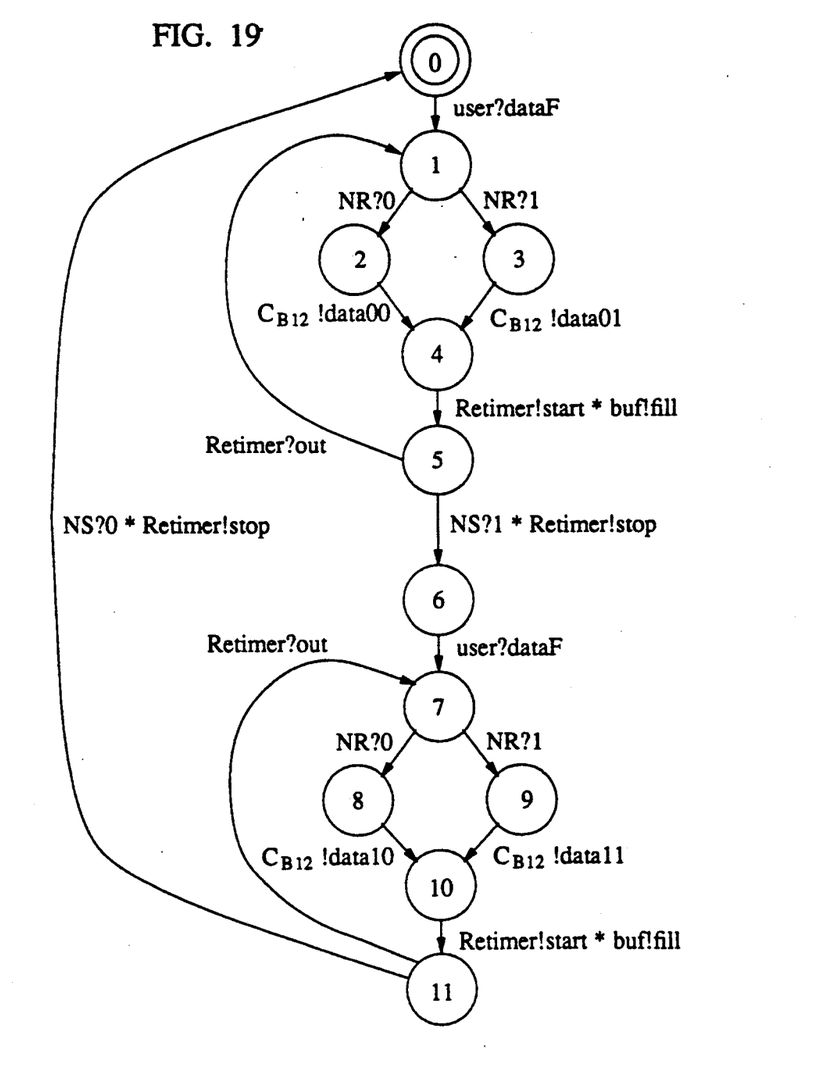
FIG. 19 presents the finite state machine for the FABP Transmitter, trans.
Figure 20:
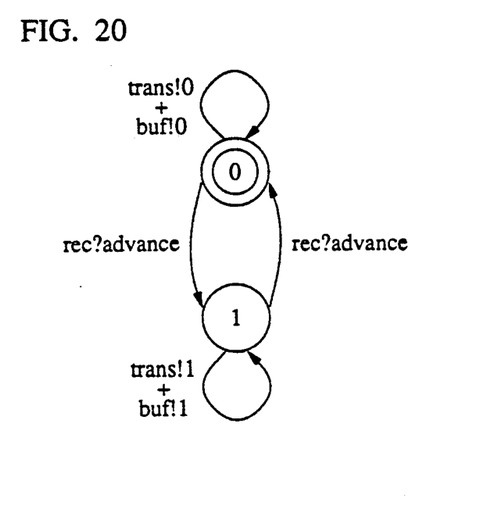
FIG. 20 presents the finite state machine for the FABP Process NR.
Figure 21:
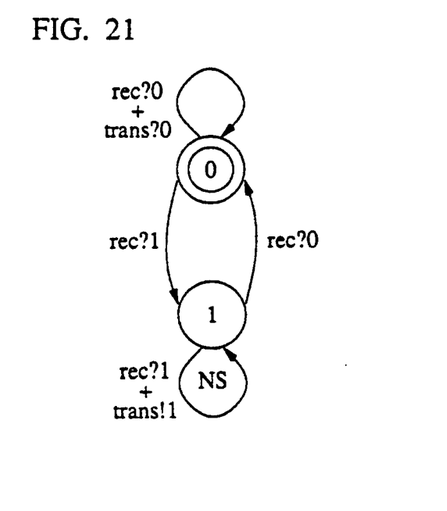
FIG. 21 presents the finite state machine for the FABP Process NS.
Figure 22:
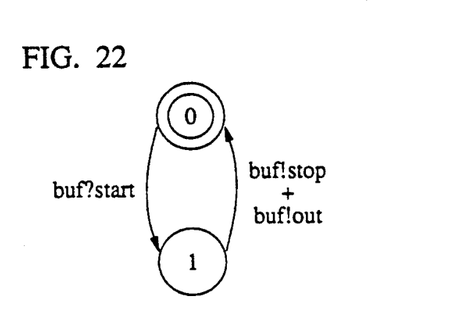
FIG. 22 presents the finite state machine for the FABP Process Atimer.
Figure 23:
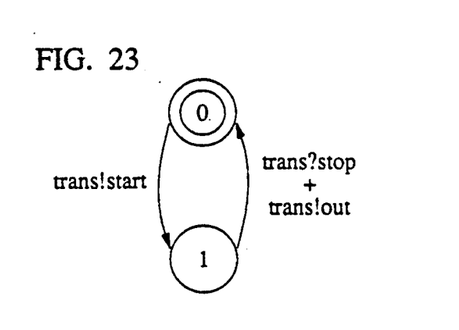
FIG. 23 presents the finite state machine for the FABP Process Retimer.
Figure 24:
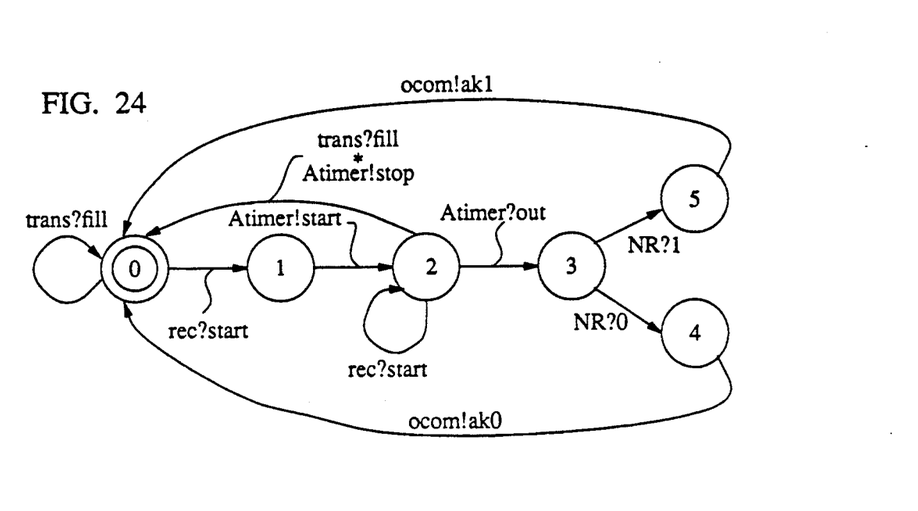
FIG. 24 presents the finite state machine for the FABP Process, buf.
Figure 25:
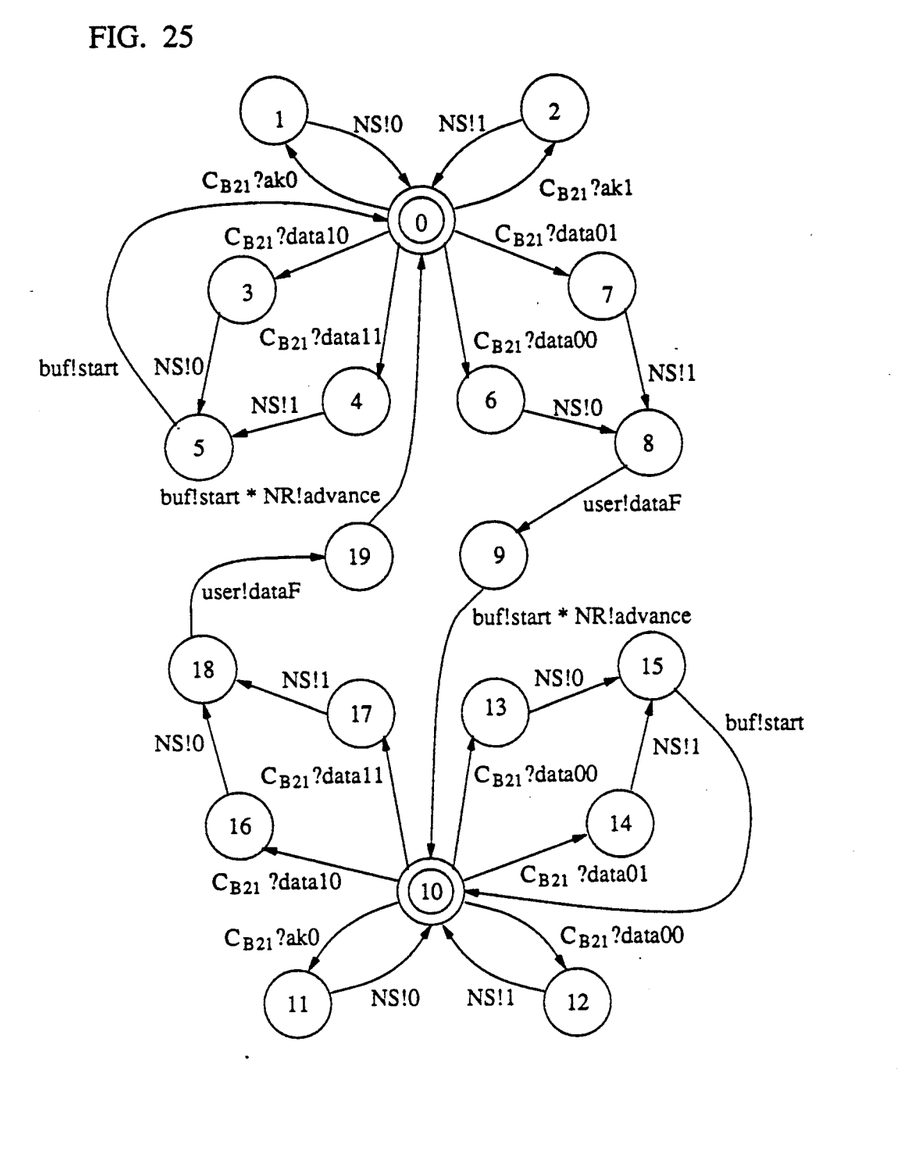
FIG. 25 presents the finite state machine for the FABP Receiver, rec.

FABP consists of two identical protocol entities 1801 and 1802 in FIG. 18 and two communications channels 1803 and 1804 (FIG. 18). Each of the protocol entities consists of seven FSMs: trans (FIG. 19); NR (FIG. 20); NS (FIG. 21); Atimer (FIG. 22), Retimer (FIG. 23); buf (FIG. 24); rec (FIG. 25). FSM trans takes care of transmission of outgoing messages. Data messages piggyback acknowledgements. Retimer is the retransmission timer. If an acknowledgement is not received within a certain timeout period after sending a data message, then this data message is retransmitted. FSM rec takes care of incoming messages: data messages and explicit acknowledgements. FSMs NS and NR store sequence numbers of the next message to be sent and of the next expected message. FSM buf takes care of sending explicit acknowledgements. When a data message is received, buf starts a timer Atimer. If a data message is not sent out before Atimer expires, then an explicit acknowledgement is sent.

Figure 26:
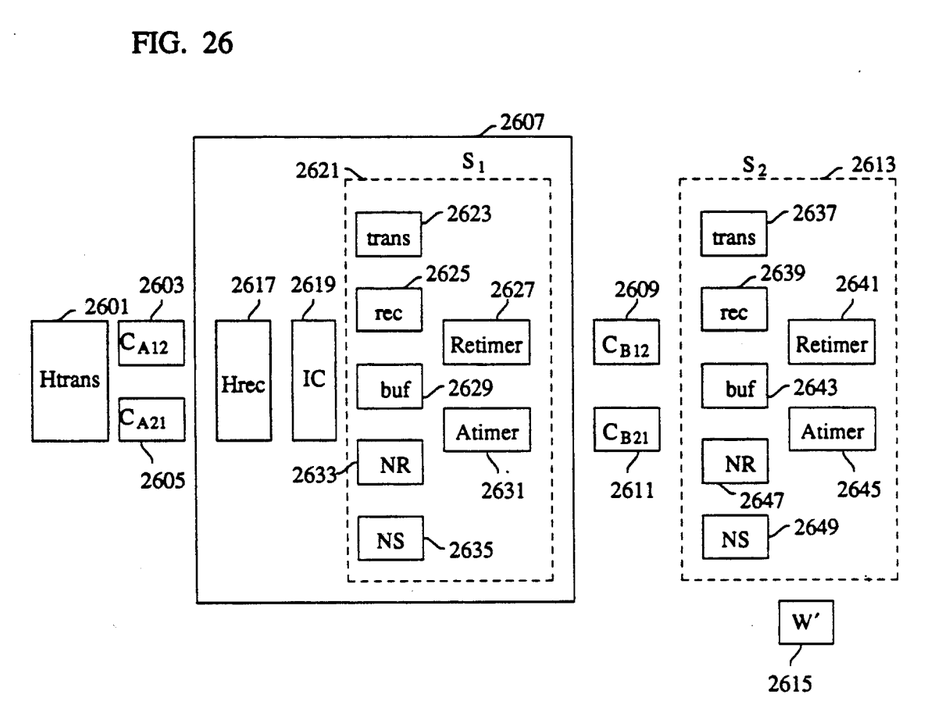
FIG. 26 presents a block diagram showing the interconnection of HABP and FABP.
Figure 27:
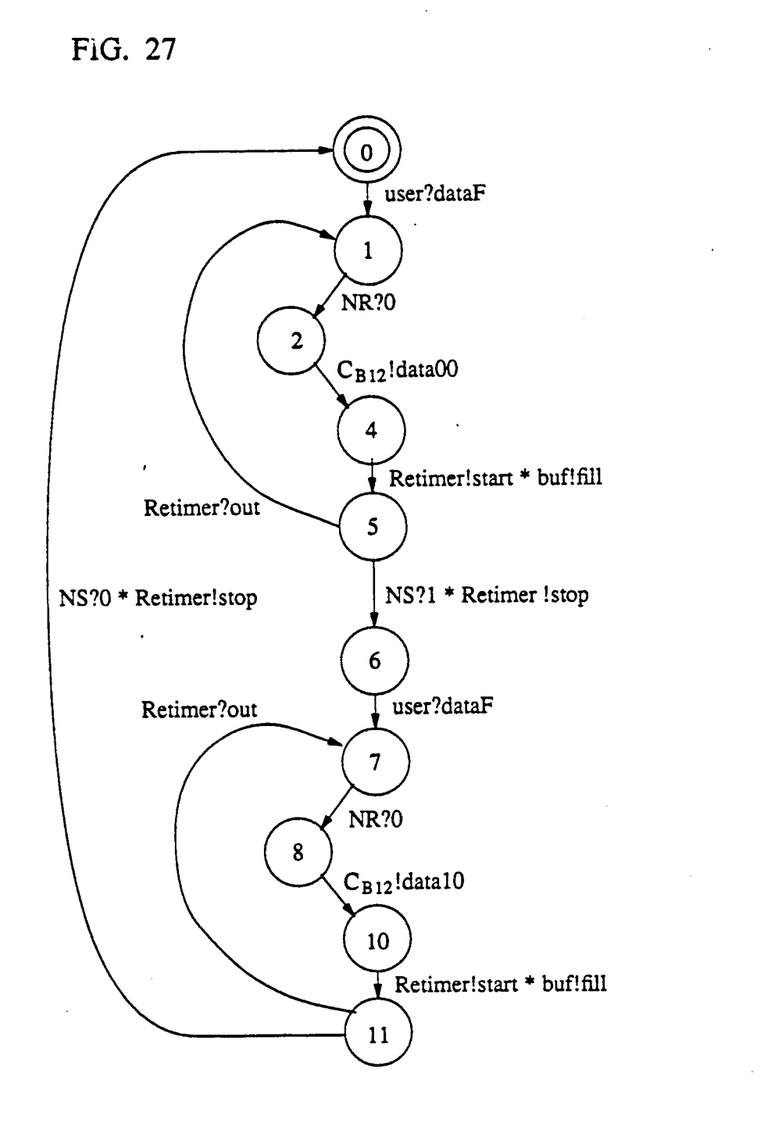
FIG. 27 presents a finite state machine for the pruned FABP Transmitter, trans.
Figure 28:
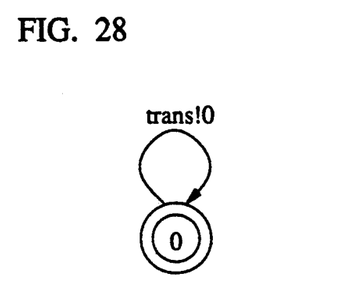
FIG. 28 presents the finite state machine for the pruned FABP Process NR.
Figure 29:
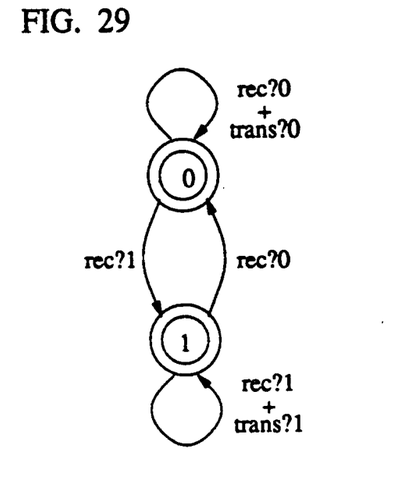
FIG. 29 presents the finite state machine for the pruned FABP Process NS.
Figure 30:
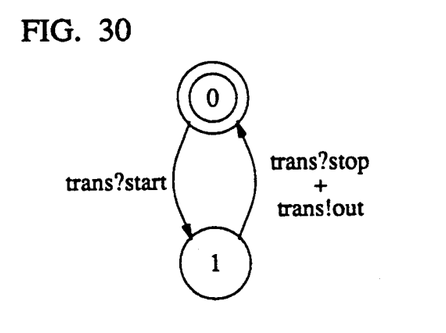
FIG. 30 presents the finite state machine for the pruned FABP Process Retimer.
Figure 31:
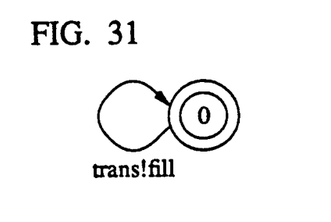
FIG. 31 presents the finite state machine for the pruned FABP Process buf.
Figure 32:
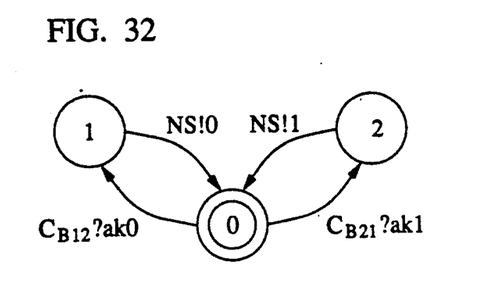
FIG. 32 presents the finite state machine for the pruned FABP Receiver, rec.

A data message has the structure dataxy where x is the sequence number of the message with two values (0; 1) and y is the piggybacked acknowledgement with two values (0; 1). There are two types of explicit acknowledgements: ak0 and ak1. Transmission of datax0 (datax1) or ak0 (ak1) means that the next expected message has the sequence number 0(1). The composition of these seven FSMs has 3,192 states and has 14,026 edges. Apply the method given earlier in Section 3.3 to these two protocols (FIG. 26). Both of them yield the same result given below.

The seven machines in $S_1$, after pruning using the Method 1 and 2 given in Section 3, are given in FIGS. 27-32. Note that the FSM for Atimer has been pruned out of existence. The composition of these pruned machines ($S_1'$) has 48 states and 192 edges. All edges in trans and rec are exercised for providing the largest common subset of services W'. These machines are not pruned.

Figure 33:
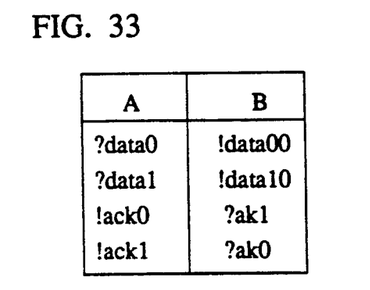
FIG. 33 presents a table of the mapping of a stateless converter.

A converter rec#IC#$S_1$ has 33,936 states. On the other hand, the converter generated by our methods, rec#IC#$S_1'$, has 336 states. This example satisfies the condition given in Section 2.4 if the converter does a simple stateless translation shown in FIG. 33.

I claim:

1. A method for synthesizing a gateway between a plurality of protocols, wherein a protocol provides a set of services, wherein each protocol is represented by a set of one or more directed graphs, wherein each directed graph includes a set of one or more edges, the method comprising the steps of:
    (a) determining a set of common services equal to a subset of the intersection of the sets of services provided by at least two of the protocols; and
    (b) determining a set of one or more processes to represent the set of common services;
    wherein the step of determining a set of one or more processes comprises the steps of:
    (1) deleting an edge of a first directed graph when the edge does not correspond to a member of the set of common services to form a first pruned directed graph;
    (2) deleting an edge of the first pruned directed graph which is not within a strongly connected component of the first pruned graph that contains the initial state to form a second pruned directed graph; and
    (3) deleting an edge of a second directed graph which does not corresponding to an edge in the second pruned directed graph.

2. A method for synthesizing a gateway between a plurality of protocols, wherein a protocol provides a set of services, wherein each protocol is represented by a set of one or more directed graphs, wherein said directed graph includes a set of one or more edges, the method comprising the steps of:
    (a) determining a set of common services equal to a subset of the intersection of the sets of services provided by at least two of the protocols; and
    (b) determining a set of one or more processes to represent the set of common serves;
    wherein the step of determining a set of one or more processes comprises the steps of:
    (1) deleting an edge of a first graph when the edge does not correspond to a member of the set of common services to from a first pruned directed graph;
    (2) determining a strong connected component of the first pruned directed graph which contains the initial state to form a strongly connected graph;
    (3) removing an edge of the first pruned directed graph which does not correspond to an edge within the strongly connected graph to form a second pruned directed graph; and
    (4) deleting an edge of a second directed graph which does not correspond to an edge in the second pruned directed graph.

* * * * *